US005584467A

United States Patent [19]
Harnett et al.

[11] Patent Number: 5,584,467
[45] Date of Patent: Dec. 17, 1996

[54] LINEAR GASEOUS FUEL FLOW CONTROLLER

[75] Inventors: Sean O. Harnett; Terry L. Cornelison; Ronald E. Chasteen, all of Washington, Mo.

[73] Assignee: Echlin Inc.

[21] Appl. No.: 300,464

[22] Filed: Sep. 2, 1994

Related U.S. Application Data

[63] Continuation-in-part of Ser. No. 120,286, Sep. 13, 1993, Pat. No. 5,343,847.

[51] Int. Cl.$^6$ ............................................. F16K 31/02
[52] U.S. Cl. ........................... 251/129.07; 251/129.17; 137/100; 123/527
[58] Field of Search ................................ 123/527, 494; 251/30.02, 129.07, 129.15, 129.17, 282; 137/100

[56] References Cited

U.S. PATENT DOCUMENTS

| | | | |
|---|---|---|---|
| 3,606,241 | 9/1971 | Bornholdt | 251/129.07 |
| 3,671,009 | 6/1972 | Stampfli | 251/129.07 |
| 3,949,964 | 4/1976 | Freeman | 251/129.07 |
| 4,662,604 | 5/1987 | Cook | 251/282 |
| 4,796,854 | 1/1989 | Ewing | 251/129.07 |
| 4,840,148 | 6/1989 | Staerzl | 123/494 |
| 4,858,853 | 8/1989 | Sonntag | 123/527 |
| 5,105,791 | 4/1992 | Nye, Jr. | 123/527 |
| 5,150,690 | 9/1992 | Carter et al. | 123/527 |
| 5,188,337 | 2/1993 | Mertens et al. | 251/282 |
| 5,353,765 | 10/1994 | Saikalis et al. | 123/527 |
| 5,367,999 | 11/1994 | King et al. | 123/527 |
| 5,377,647 | 1/1995 | Jones | 123/527 |
| 5,401,087 | 3/1995 | Goossens | 251/129.07 |

*Primary Examiner*—Erick R. Solis
*Attorney, Agent, or Firm*—Richard W. Hanes

[57] ABSTRACT

A fluid flow control system which can function under a range of input pressures for regulating the flow of fluid as a function of a variable input voltage and having a feedback feature which produces an electrical signal equivalent to the volume of fluid actually flowing from the control system, comprising a pressure balanced valve, a proportional solenoid having a movable shaft responsive to the input voltage and adapted to open the valve, said valve including, a fluid intake chamber having an intake port and a valve port, a fluid discharge chamber having a discharge port, a valve disk and a cooperating valve seat where the valve disk is connected to the shaft of the proportional solenoid so as to open and close the valve, a flexible diaphragm having a centrally disposed piston in contact with the valve disk a pressure equalizing chamber contiguous to the diaphragm, a biasing spring in contact with the piston and exerting a force thereon in a direction toward the valve disk for normally maintaining the valve disk sealed against its valve seat, and a fluid flow measurement device disposed in the discharge port for measuring the fluid flowing from the fluid discharge chamber.

2 Claims, 4 Drawing Sheets

LINEAR GASEOUS FUEL FLOW CONTROLLER

This application is a Continuation-in-Part application of application Ser. No. 08/120,286, now U.S. Pat. No. 5,343,847, entitled Electronic Gaseous Fuel Injection System, filed Sep. 13, 1993.

The present invention relates generally to electronic fuel injection systems for internal combustion engines which use gaseous fuels, such as liquid petroleum gas (LPG) or compressed natural gas (CNG), and in particular to a fuel flow controller within such a system which controller utilizes a novel pressure balanced valve to obtain highly responsive fuel control over the entire operating range of the engine and which can accommodate a wide range of fuel pressures.

BACKGROUND

Development of internal combustion engine fuel control apparatus having electronic controlled fuel injectors has heretofore been concerned to a great extent with means and methods involving control of cycle injection timing and the parameters governing the fuel injector open duration. Controlling these variables on liquid fuel consuming engines requires sophisticated control apparatus and electrically controlled fuel injectors for each cylinder of the engine. The high cost and complexity of these components has created a need for a less expensive and simpler alternative. Additionally, the need for controlling vehicular created air pollution has placed increasing emphasis on the use of fuels which burn cleaner and reduce pollution, such as gaseous fuels, including LPG and CNG.

Therefore, the primary object of the present invention is to provide an electronic controlled fuel injection system for gaseous fuels which eliminates cylinder specific controlled fuel injectors and the appurtenant wiring and controls for each cylinder.

A further object of the invention is to provide a system using a single fuel line to a fuel delivery plenum, or fuel rail, in an internal combustion engine which uses gaseous fuel, in which the fuel flow rate in the single fuel line is electronically controlled by a closed loop system capable of adjusting to an optimum fuel flow rate in accordance with the demands of a plurality of engine operating conditions.

A further object of the invention is to provide a system and a controller therefor which can accommodate a single fuel line to a fuel delivery plenum in an internal combustion engine which uses gaseous fuel for either multi-port injection or central point injection, either upstream or downstream of the throttle valve.

Another object of the invention is to provide a means for controlling gaseous fuels to internal combustion engines in a manner which will deliver a fuel quantity which will achieve the optimum fuel/air ratio for the instant operating condition of the engine, while at the same time reducing unwanted exhaust emissions.

Another object of the invention is to provide means for delivering gaseous fuels to an internal combustion engine with the same sophistication and precision as has been done with gasoline delivery systems, but with substantially reduced costs.

Another object of the invention is to provide a fuel flow control unit which can function optimally over a wide range of fuel pressures.

A still further object of the invention is to provide a fuel flow control which will operate linearly over its entire operating range without unwanted spikes or rushes of fuel when the controller first admits fuel to the system, or conversely, prematurely shuts off fuel when demand is reduced.

Also an object of the invention is to provide a fluid flow control device which is regulated by the electrical voltage supplied to the controller and which returns a voltage indicative of the fluid output volume and returns a second voltage indicating the temperature of the fluid leaving the controller so that the two return voltages may be used to compute the mass of the fluid leaving the controller.

Other and further objects, features and advantages of the invention will become apparent upon a reading of the following description of a preferred form of the invention.

SUMMARY OF THE INVENTION

The present invention provides apparatus for electronically controlling fluid delivery to a using system, such as, for example, an internal combustion engine. More particularly, the invention may be summarized in the context of apparatus for electronically controlling fuel injected into an internal combustion engine, where the fuel is of a gaseous type such as liquid petroleum gas (LPG) or compressed natural gas (CNG). The apparatus of the invention lends itself not only to original manufacture installations but also to the retrofit of existing liquid fuel injected engines. Instead of traditional electrically controlled fuel injectors, the apparatus of the present invention utilizes atomizer nozzles connected to a common fuel plenum, or fuel rail, which obtain gaseous fuel through a fuel line connected to an electronic fuel flow control unit. Through a proportional solenoid, whose shaft position is a function of multiple operating variables, the fuel flow is regulated by a pressure balanced fuel valve. From the fuel valve the fuel is fed into a fuel distribution rail and into the atomizer nozzles for each cylinder. Many of the variables, such as barometric pressure and the temperature of various operating and environmental elements are input into the control system in an open loop type of configuration. However, two of the controlling variables are input to the control unit though a closed loop feedback system. The closed loop inputs include a signal representing the oxygen content of the engine exhaust gas and a second signal representing the difference between the instantaneous fuel flow being measured in the control unit and the predetermined optimum fuel flow for the then instantaneous engine load and rotational speed.

DETAILED DESCRIPTION

Figure 1:
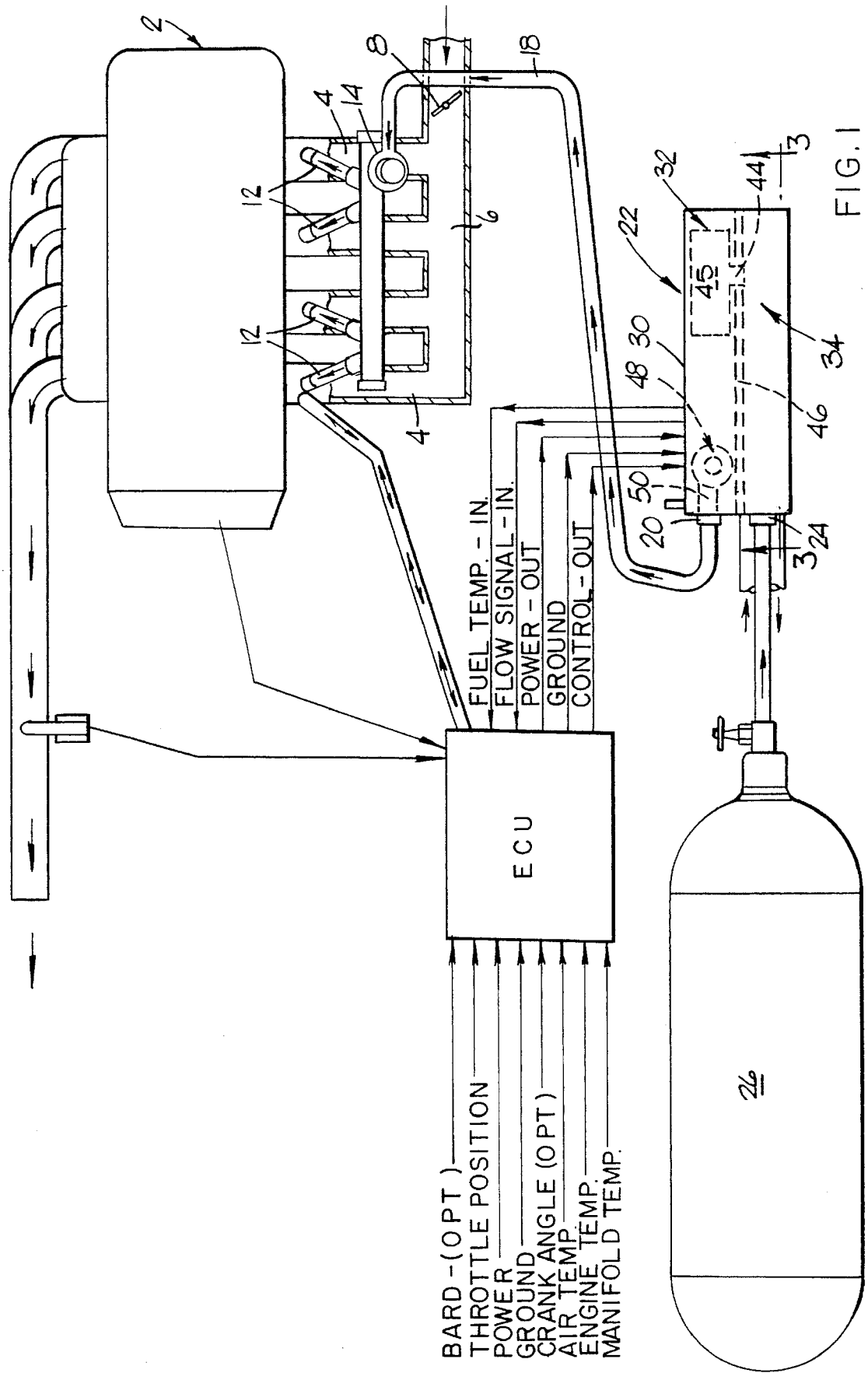
FIG. 1 is a schematic diagram illustrating the various components of the fuel flow system of the present invention and their respective interconnections.
Figure 2:
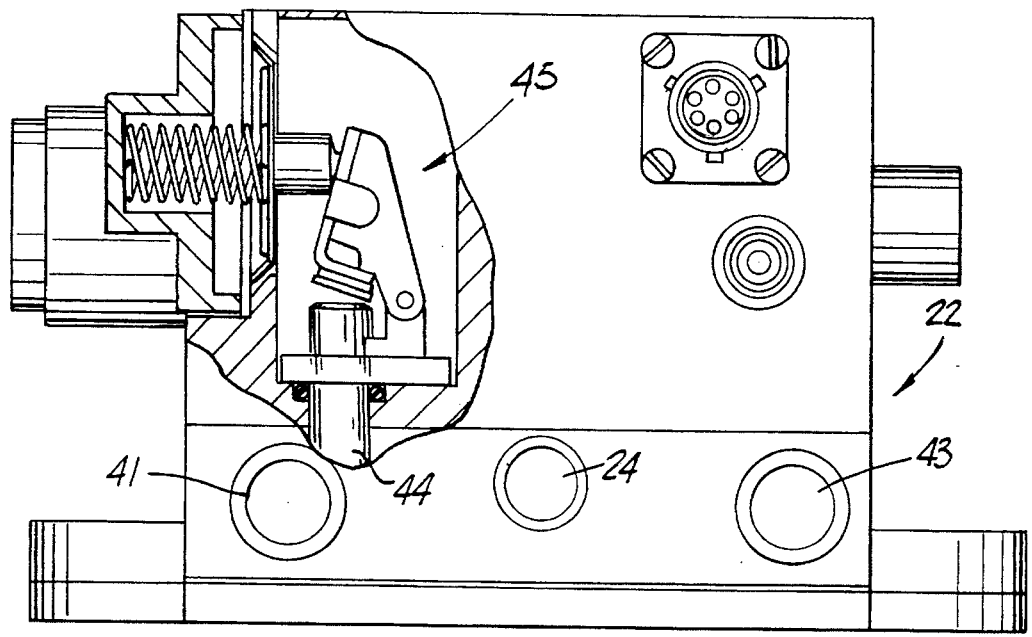
FIG. 2 is a front view of the fuel flow controller of the system of the present invention with a portion of the front wall broken to reveal the pressure regulating valve which admits fuel from the bottom compartment of the control unit to the upper compartment.

A typical internal combustion engine comprising cylinders (four), pistons, valves, ignition means and crankshaft is depicted generally in FIG. 1 by the reference numeral 2. Air is delivered to each of the engine's cylinders by separately tuned runners 4 which are in fluid communication with an air plenum 6. Air flow to the plenum is controlled by a throttle or butterfly valve 8 positioned at the head end on the plenum. In a typical fuel injected engine, electronic fuel injectors are positioned in ports of the tuned fuel runners 4, however in the apparatus of the present invention the electronic fuel injectors are each replaced with an inexpensive atomizer nozzle 12, which can amount to no more than an aluminum tube having a fuel conducting bore through its length. The fuel delivery end of each atomizer nozzle is positioned very close to the intake valve of the engine cylinder to which it pertains.

The fuel intake end of each atomizer nozzle 12 is connected so as to be in fluid communication with a fuel delivery rail 14. This fuel rail is connected to one end of a fuel line 18, the other end of which is connected to the fuel output port 20 of a fuel flow control unit 22. Fluid fuel from a tank 26 containing liquid petroleum gas will be in liquid form when first introduced into the flow control unit at intake port 24 and will need to be vaporized before introduction into the engine. On the other hand, gaseous fuel such as compressed natural gas will already be in a gaseous state when introduced to the fuel inlet 24.

Figure 3:
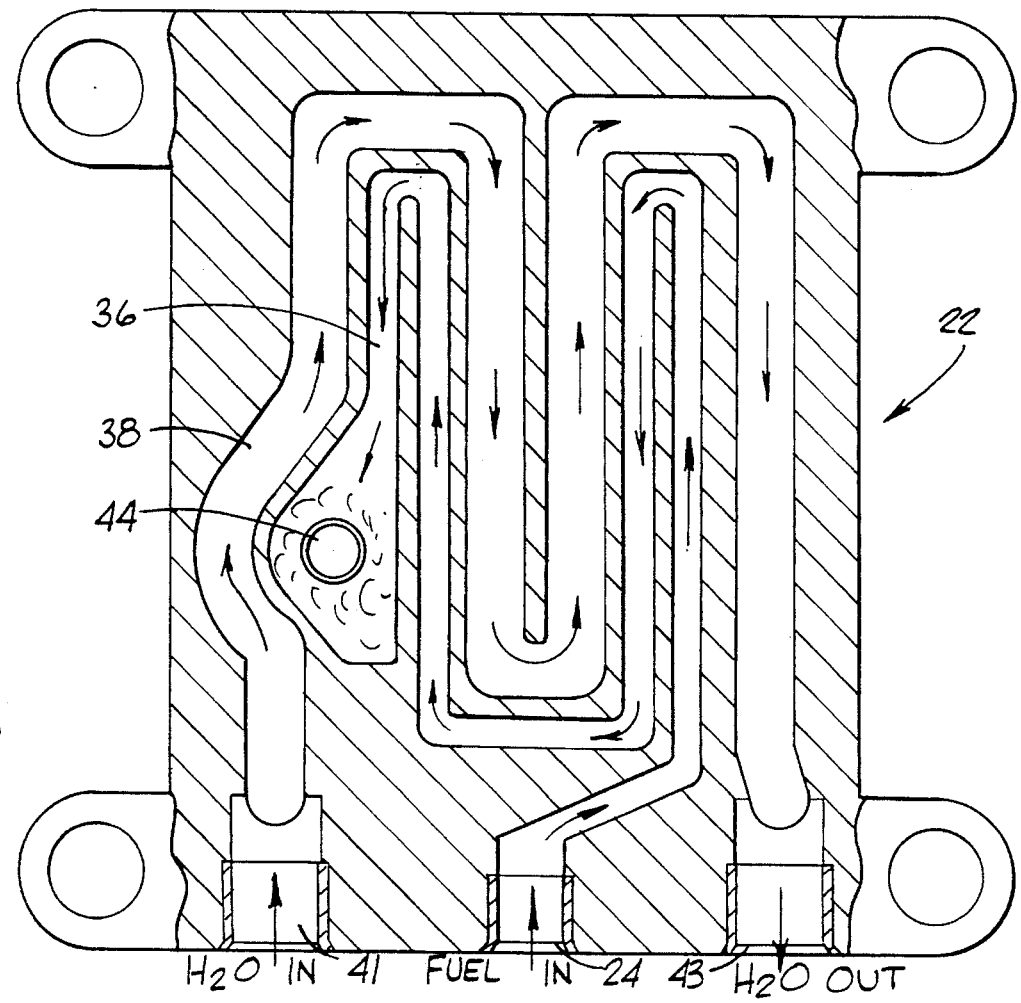
FIG. 3 is a cross sectional view of the fuel flow control unit taken along lines 3—3 of FIG. 1.

As seen diagrammatically in FIG. 1, a fuel flow control unit 22 comprises a housing 30 which is horizontally divided into upper and lower sections 32 and 34. A diagrammatic view of a typical vaporizer unit which occupies the lower section is seen in FIG. 3. The vaporizer 34 is subdivided into two independent and separated labyrinths or mazes 36 and 38. The fuel maze or conduit 36 communicates with the fuel inlet 24 which is connected directly to the fuel tank 26 or to an intermediate pressure reducer (not shown in the drawings), if such is necessary, as with the use of compressed natural gas. The hot fluid maze or conduit 38 is interlaminated with the fuel maze 36 in order to achieve maximum heat transfer from a hot fluid circulating therein, such as engine coolant, exhaust gas or engine lubricant, entering the maze at port 41 and exiting at port 43. The purpose of heating the fuel is to vaporize it if the fuel is in a liquid form entering the fuel inlet 24. The fuel maze 36 terminates in the entry port 44 of a standard pressure regulator 45 carried by the partition 40 which separates the upper and lower sections of the control unit 22. As fuel is passed through the regulator 45 its pressure is reduced to that which is appropriate for the engine with which the system is operating. One of the purposes of the control device of the present invention is to be flexible in its adaptability to various form of service, including the accommodation of a wide range of fluid pressures applied to the input. Accordingly, the primary control valve 48 of the control unit 22 should be chosen so as to accommodate fuel pressures of from 4 to 125 psig or higher. And, as will be explained later, the pressure balanced valve 48 and its associated apparatus can also operate within this same pressure range.

The upper section 32 of the controller 22 contains the pressure regulator 45, a fuel inlet conduit 52 from the pressure regulator 45, a proportional solenoid 46, a fuel control valve 48 and a fuel output conduit 50 having a sharp edged reduced diameter orifice 51 with upstream and downstream pressure taps 53 and 55 respectively and an associated fuel flow measuring device 57, utilizing the pipe tap method of measuring fluid flow volume across an orifice. A fuel temperature sensor 54 is provided downstream of the last pressure tap 55 to sense the fuel temperature and produce a voltage output proportional to the fuel temperature.

Figure 4:
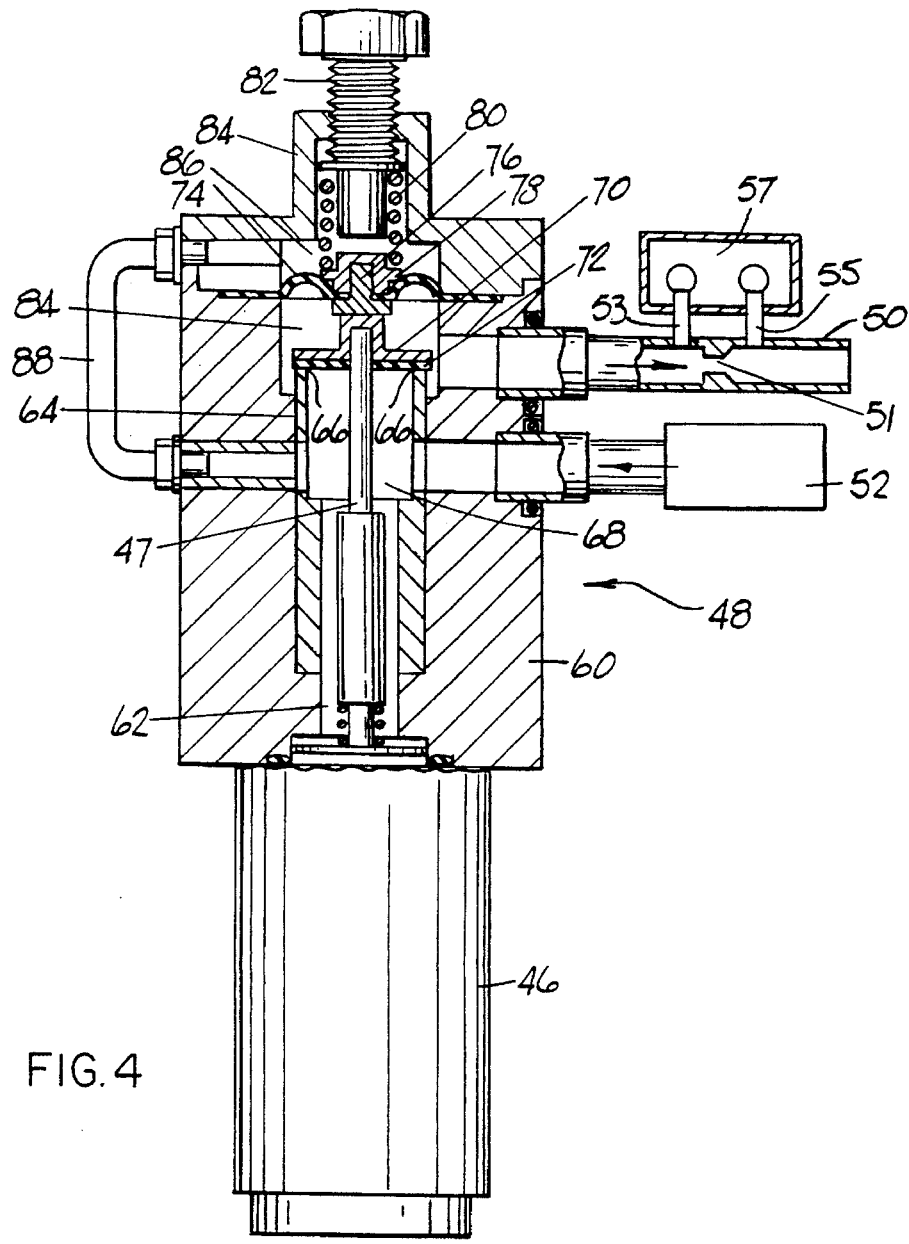
FIG. 4 is an enlarged fragmentary cross sectional view of the control valve of the present invention, showing in diagrammatic fashion the fuel input and output connections to the valve, all of which are part of the control unit.
Figure 6:
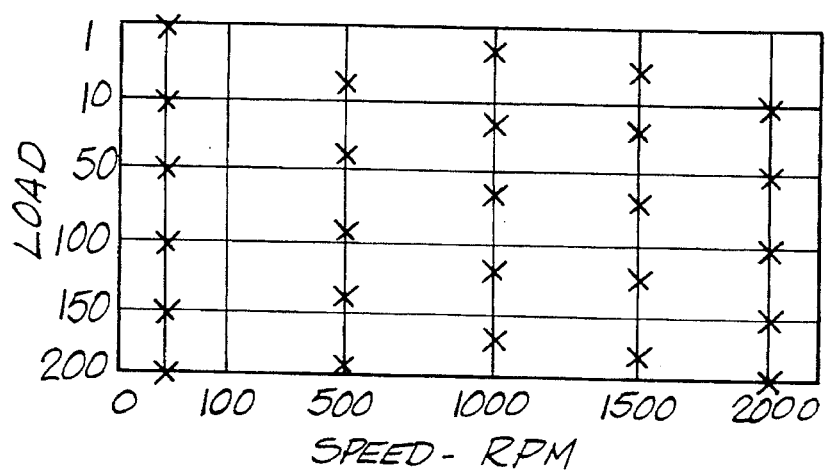
FIG. 6 is a diagrammatic look up table of optimum fuel flow values of the internal combustion engine with which the system of the present invention is working, having engine load (throttle position or manifold pressure, for example) and engine rotational speed as its variables displayed on the ordinate and abscissa respectively.

The focus of the present invention, as illustrated in the diagram of FIG. 4, centers around a proportional solenoid 46 which actuates a balanced fuel control valve 48. At least two commercially available solenoids will satisfactorily suit the requirements of the invention. One such solenoid is made by Magnet-Schultz of America, Inc., the 35 or 45 series. Another satisfactory solenoid is the Ledex, E5 or E6 series. Both such solenoids operate on 12 vdc and are capable of 100% duty cycle with the shaft stroke and force proportional to input voltage or current. In the drawings, the longitudinally movable shaft of the proportional solenoid is referred to by reference numeral 47. The voltage applied to the solenoid is derived from the output of an electronic control unit (ECU) 49, the voltage output line of that unit being labeled in the diagram of FIG. 1 as "Control-Out". The ECU 49 is traditional to the extent that basic fuel flow output voltage is determined as a function of the engine load and engine speed. In the present invention, this basic fuel flow value is determined by the flow measuring device 57 whose voltage output is labeled in FIG. 1 as "Flow Signal-In". A constantly updated fuel control signal is created by comparing the actual fuel flow volume with a pre-established basic fuel flow value for the existing engine load and engine speed conditions. The basic value is determined from an electronically stored digital array of predetermined optimized fuel flow values for a particular engine or engine family which fuel flow values are a function of engine load and engine speed, as shown in FIG. 6. This updated fuel flow value is further modified by various existing operating and environmental parameters such as engine temperature, barometric pressure, air temperature, engine temperature, fuel temperature and fuel pressure, as is well known in the electronic fuel injection art.

The fuel valve 48 comprises a body 60 having an internal longitudinal bore 62 into which the shaft 47 of the solenoid 46 is disposed, acting as a valve stem. A portion of the bore is lined with a cylindrical tube 64, the upper terminal end of which acts as the valve seat 66 and the interior of which acts as the intake chamber 68 for incoming fuel. Attached to the distal end of the solenoid shaft 47 is a flat valve disk 70 having a rubber or other sealing surface 72 coveting the bottom thereof in order to make sealing contact with the valve seat 66.

Disposed above the valve disk 70 and perpendicularly partitioning the upper portion of the bore 62 is a convoluted diaphragm 74 having a spring seat piston 76 attached to the center of the diaphragm. The lower surface of the piston 76 is in contact with an upwardly protruding boss located in the center section of the valve disk 70. The hollow interior of the boss 77 accommodates the end of the solenoid shaft. The portion of the piston 76 above the diaphragm carries a peripheral flange, or spring seat 78, against which bears the lower coil of a valve spring 80. The valve spring 80 is held in place by a threaded bias adjusting bolt 82 carded by the valve bonnet 85, which covers and seals the bore 62 and is secured to the valve body 60. The adjusting bolt 82 can be tamed to modify the working length and the pre load force of the spring 80 which the spring applies to the solenoid shaft, acting through the piston 76.

The valve disk 70 and the diaphragm-piston combination divide the bore 62 into three compartments. The first has already been identified as the intake chamber 68 for incoming fuel. The second compartment exists between the disk 70 and the diaphragm-piston combination and will be referred to as the fuel output chamber 84. The third compartment exists above the diaphragm 74 and acts as the pressure equalizing chamber 86. The fuel output chamber 84 opens into a port in the valve body which is coupled, through appropriate conduit, to the sharp edged orifice 51 and its associated pressure ports 53 and 55, all of which are adapted to measure the volume of fuel flow from the valve 48. A pressure balancing conduit 88 interconnects the intake chamber 68 and the pressure equalizing chamber 86 so that the same fuel pressure which exists in the intake chamber will also exist above the diaphragm in the equalizing chamber.

The smooth and novel operation of the valve is accomplished by careful arrangement of the respective dimensions of the diaphragm/piston combination vis-à-vis the dimensions of the valve disk 70, together with the proper selection of the pre load force exerted against the solenoid shaft by the valve spring 80. As already stated, the fluid pressure existing on top of the diaphragm in equalizing chamber 86 is identical to the pressure beneath the valve disk 70 in the fuel intake chamber 68. The objective, however, is to establish a downward closing force on the diaphragm/piston combination which is somewhat in excess of the upward force applied to the bottom of the disk 70 by the fluid pressure existing in the fuel intake chamber 68. A net closing force of 1 to 3.5 pounds would be appropriate, although this range is not critical. Since the piston 76 remains in contact with the boss in the center of the disk 70, this differential force valve, representing a normal valve closing force is sufficient to keep the valve disk sealed against its seat 66 until it is removed by the force of the solenoid shaft 47. While the exact force differential across the valve disk may vary slightly as a function of the intake pressure, the net closing force will remain almost constant over a range of intake fuel pressures from 4 to 125 psi or higher.

In order to calculate the force differential across the diaphragm the effective areas of both the convoluted diaphragm/piston combination and the valve disk must be determined. In determining the diaphragm/piston area, where the diameter of the diaphragm is $D_1$ and the piston diameter is $D_2$ the effective area of the combination is equal to $0.785 D_1^2 Y$, where $Y=\frac{1}{3}(1+K+K^2)$ and where $K=D_2/D_1$. The effective area of the disk 70 includes the area of the disk itself minus the exposed surfaces of the solenoid shaft 47 which are effectively normal to the longitudinal axis of the shaft 47 and which tend to contribute to the valve opening force in response to the pressure of the fuel in the intake chamber 68. In order that these total forces tending to open the valve be properly determined it is necessary that the interior of the solenoid 46 be vented to the fuel intake chamber 68 in order that the intake fuel pressure be equally distributed around all components of the solenoid 46 and its shaft 47. Thus, with the dimensions of the diaphragm/piston combination and the valve disk appropriately chosen, it is seen that a small force differential of three pounds, for example, will maintain the valve normally closed.

Figure 5:
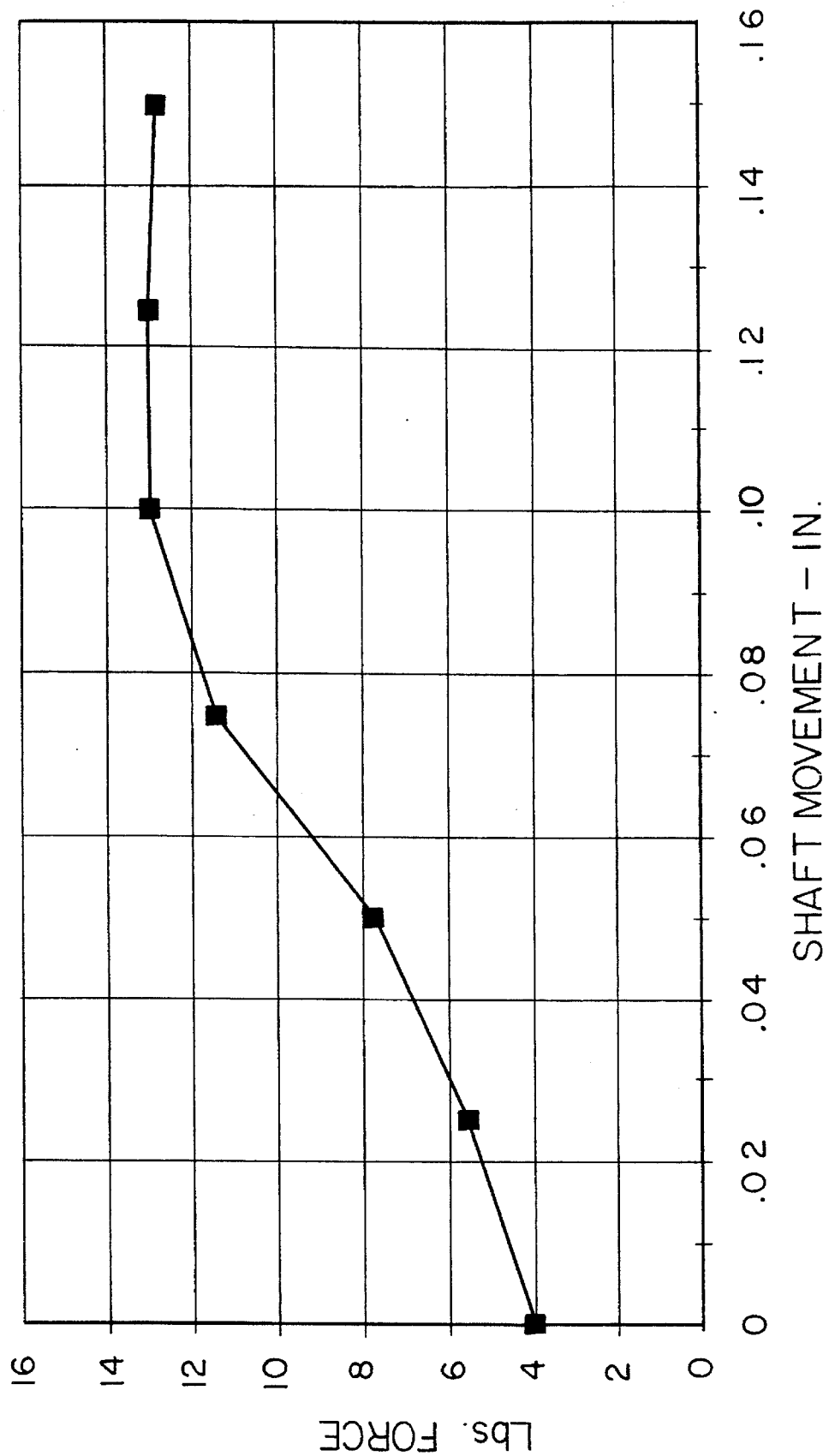
FIG. 5 is a plot of the performance specification of the proportional solenoid used in the apparatus of the present invention with two springs of different spring rates, showing the pounds of force exerted by the solenoid shaft as related to the longitudinal movement of the solenoid shaft.

The differential closing force is overcome and the valve is opened by extending movement of the shaft 47 of the proportional solenoid 46, in accordance with the amplitude of a control voltage applied to the solenoid. The linear curves of FIG. 5 illustrate typical performance curves of a solenoid chosen for use in the apparatus of the present invention. The longitudinal valve opening force exerted by the solenoid is shown as a function of shaft travel for two different valve springs each having a different spring rate. It is seen that the solenoid shaft provides a linear increase in force exertion from its starting position to its maximum extension of approximately 0.150 inches. Changes in the input voltage to the solenoid vary the amount of longitudinal movement of the shaft 47. As shown in FIG. 5, the force exerted by the shaft will also constantly increase to overcome the increasing resistance of a load, such as the increasing resistance force exerted by the valve biasing spring 80 as it is compressed by the extension of the solenoid shaft. Thus, when first assembled, the shaft 47 is pressed downwardly by the selected initial pre load force of the valve spring 80 to a position close to the bottoming stop of the shaft, with sufficient bottoming clearance to insure that the spring force seats the valve disk against its seat. The differential closing force of approximately three pounds dictates a pre load spring force of approximately twice the differential valve closing force, or about four pounds. As increasing voltage is applied to the solenoid and the solenoid shaft extends, the biasing spring 80 is compressed to its working height, exerting increasing resistance at an approximately linear rate which is similar to the rate of increasing force supplied by the solenoid. In the preferred form of the invention the solenoid may exert about twelve pounds of force against the spring when the solenoid shaft is fully extended to approximately 0.150 inches. This force is more than sufficient force to open the valve against a designed closing pressure of three pounds. Without the further intervention of the structure of the present invention however, the valve would have a tendency to pop open or "overshoot" as soon as the normal closing pressure of three pounds is equaled or slightly exceeded by the solenoid shaft opening pressure. This tendency is undesirable for smooth fuel control because the overshoot admits a "spike" or overcharge of fuel which is not representative of the fuel control signal from the ECU. The reverse, and equally undesirable, result is seen when the valve is on the verge of closing. In that case the venturi flow force of the fluid flowing through the small valve opening which is present in low fluid flow situations tends to suck the valve closed prematurely, causing interruption of the fuel flow and consequent ragged fuel control.

The apparatus of the present invention overcomes the "pop open" and "sucked closed" syndrome. This is accomplished by providing means such as the biasing adjustment bolt 82 to pre load the valve spring with approximately five pounds of force, which is three pounds in excess of the differential valve closing force described above, but well within the capabilities of the solenoid. Thus, when the solenoid force equals or even somewhat exceeds the normal force which biases the valve disk to remain closed the valve does not pop open but remains closed until the solenoid force equals the pre-load spring force of five pounds, in this example. From that point on the valve opens and closes smoothly in response to the movement of the solenoid shaft. If the solenoid voltage is decreased, the shaft retracts in response to the spring force; however since the range of the working forces between the shaft and the spring are always in excess of the normal closing bias on the valve disk, the disk cannot respond to the above mentioned tendancy to snap closed in low fluid delivery situations. Both the pop open and sucked closed phenomenon are overcome, with the result that the actual fuel flow follows very closely and accurately the changes in the fuel control signal.

We claim:

1. A fluid flow control system for regulating the flow of fluid under a range of pressures as a function of a variable input voltage, comprising:

a proportional solenoid having a movable shaft responsive to the input voltage, a pressure balanced valve including, a fluid intake chamber having, an intake port, and an output port which comprises a valve seat and a cooperating valve disk which is connected to the shaft of the proportional solenoid, a fluid output chamber having a fluid discharge port and communicating with the fluid intake chamber through the said output port, a flexible diaphragm having a centrally disposed piston with upper and lower portions and wherein the lower portion of the piston is in contact with the valve disk, a pressure equalizing chamber contiguous to the diaphragm, conduit means interconnecting the fluid intake chamber and the pressure equalizing chamber;

biasing means in contact with the upper portion of the piston and exerting a force thereon in a direction toward the valve disk, tending to keep the valve disk sealed against the valve seat, and wherein the diaphragm and piston and the valve disk are respectively sized and dimensioned so that the equal pressures existing in the intake chamber and the pressure equalizing chamber and acting on the diaphragm and the valve disk will produce a force differential that will, absent other forces acting on the disk, keep the disk closed against the valve seat, and wherein the force exerted by the biasing means is greater than the said differential force.

2. A fluid flow control system for regulating the flow of fluid under a range of pressures as a function of a variable input voltage, comprising:

a pressure balanced valve, solenoid means having a movable shaft responsive to the input voltage and adapted to open the valve, said valve including, a fluid intake chamber having an intake port and a valve port, a fluid discharge chamber having a discharge port, a valve disk and a cooperating valve seat comprising the valve port where the valve disk is disposed in operating relationship with the shaft of the proportional solenoid, a flexible diaphragm having a centrally disposed piston in contact with the valve disk, a pressure equalizing chamber contiguous to the diaphragm, conduit means interconnecting the fluid intake chamber and the pressure equalizing chamber, biasing means in contact with the piston and exerting a force thereon in a direction toward the valve disk for normally maintaining the valve disk sealed against the valve seat, and means disposed in the discharge port for measuring fluid flowing from the fluid discharge chamber.

\* \* \* \* \*